United States Patent
Berger et al.

(10) Patent No.: US 9,884,544 B2
(45) Date of Patent: Feb. 6, 2018

(54) UNDERBODY UNIT FOR A MOTOR VEHICLE

(71) Applicant: Dr. Ing. h.c. F. Porsche Aktiengesellschaft, Stuttgart (DE)

(72) Inventors: Dennis Berger, Bietigheim-Bissingen (DE); Thomas Fritz, Loechgau (DE)

(73) Assignee: Dr. Ing. H.c.f. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/736,448

(22) Filed: Jun. 11, 2015

(65) Prior Publication Data
US 2015/0360550 A1 Dec. 17, 2015

(30) Foreign Application Priority Data
Jun. 11, 2014 (DE) .......... 10 2014 108 160

(51) Int. Cl.
*B60K 1/04* (2006.01)
*B62D 25/20* (2006.01)
(Continued)

(52) U.S. Cl.
CPC ............ *B60K 1/04* (2013.01); *B60L 11/1874* (2013.01); *B62D 25/20* (2013.01); *B60K 11/02* (2013.01);
(Continued)

(58) Field of Classification Search
CPC ...... B60K 1/00; B60K 1/04; B60K 2001/003; B60K 2001/005; B60K 2001/0438; B60K 2001/0472
See application file for complete search history.

(56) References Cited

U.S. PATENT DOCUMENTS

| | | | |
|---|---|---|---|
| 5,585,204 A | 12/1996 | Oshida et al. | |
| 5,833,023 A * | 11/1998 | Shimizu | B62D 21/00 180/68.5 |

(Continued)

FOREIGN PATENT DOCUMENTS

| | | |
|---|---|---|
| DE | 102009006990 | 8/2010 |
| DE | 102009058809 | 6/2011 |

(Continued)

OTHER PUBLICATIONS

Search Report for DE 10 2004 108 160.9 dated Dec. 10, 2014.
Japanese Office Action.
Chinese Office Action Dated Nov. 3, 2017.

*Primary Examiner* — Katy M Ebner
(74) *Attorney, Agent, or Firm* — Gerald E. Hespos; Michael J. Porco; Matthew T. Hespos

(57) ABSTRACT

An underbody unit (10) for reinforcing a motor vehicle body of a motor vehicle has a floor body (12) that is connectable to the motor vehicle body for dissipating loads of the motor vehicle body. The floor body (12) has an upper side (32) for supporting battery cell units (18) of a traction battery for driving the motor vehicle purely electrically and at least one cooling channel (26) for cooling the upper side (32). The floor body (12) and the underbody unit (10) form a supporting plate of a battery housing and can: support the battery cells (18) of the traction battery, form an armor plating to protect the battery cells (18) and define a heat exchanger that can actively and/or passively cool the battery cells (18) with the aid of the cooling channel (26).

12 Claims, 2 Drawing Sheets

(51) Int. Cl.
*B60L 11/18* (2006.01)
*B60K 1/00* (2006.01)
*B60K 11/02* (2006.01)

(52) U.S. Cl.
CPC .................. *B60K 2001/005* (2013.01); *B60K 2001/0438* (2013.01)

(56) References Cited

U.S. PATENT DOCUMENTS

| | | | | |
|---|---|---|---|---|
| 6,085,854 | A | 7/2000 | Nishikawa | |
| 8,608,230 | B2* | 12/2013 | Young | B60K 1/04 296/187.02 |
| 8,646,830 | B2* | 2/2014 | Hettinger | B60K 1/04 296/187.08 |
| 8,859,126 | B2* | 10/2014 | Yamada | B60K 1/04 429/100 |
| 8,939,246 | B2* | 1/2015 | Yamaguchi | B60K 1/04 180/311 |
| 9,045,030 | B2* | 6/2015 | Rawlinson | B60K 1/04 |
| 9,052,168 | B1* | 6/2015 | Rawlinson | F41H 7/042 |
| 9,172,071 | B2* | 10/2015 | Yoshioka | B60K 1/04 |
| 9,227,582 | B2* | 1/2016 | Katayama | B60K 1/04 |
| 2010/0190044 | A1 | 7/2010 | Nishino | |
| 2012/0103714 | A1* | 5/2012 | Choi | B60K 1/04 180/68.5 |
| 2012/0312614 | A1 | 12/2012 | Fujiwara et al. | |
| 2013/0189558 | A1 | 7/2013 | Haussmann | |
| 2013/0241493 | A1* | 9/2013 | Kosaki | B60K 1/04 320/128 |
| 2014/0246259 | A1 | 9/2014 | Yamamura et al. | |
| 2014/0315064 | A1* | 10/2014 | Katayama | B60K 1/04 429/120 |
| 2014/0338999 | A1* | 11/2014 | Fujii | B60K 1/04 180/68.5 |
| 2015/0147618 | A1* | 5/2015 | Nakamori | B60K 1/04 429/96 |
| 2015/0249238 | A1* | 9/2015 | Andre | B60K 1/04 429/99 |
| 2015/0249240 | A1* | 9/2015 | Hihara | B60K 1/04 180/68.5 |
| 2015/0343971 | A1* | 12/2015 | Ikeda | B60K 1/04 429/100 |

FOREIGN PATENT DOCUMENTS

| | | |
|---|---|---|
| DE | 102010013025 | 9/2011 |
| DE | 102010024320 | 12/2011 |
| DE | 102011114772 | 4/2013 |
| JP | 2011112083 | 9/2011 |
| JP | 201149138 | 10/2011 |

* cited by examiner

UNDERBODY UNIT FOR A MOTOR VEHICLE

CROSS REFERENCE TO RELATED APPLICATION

This application claims priority under 35 USC 119 to German Patent Appl. No. 10 2014 108 160.9 filed on Jun. 11, 2014, the entire disclosure of which is incorporated herein by reference.

BACKGROUND

1. Field of the Invention

The invention relates to an underbody unit for a motor vehicle that helps to reinforce a motor vehicle body of a motor vehicle.

2. Description of the Related Art

A motor vehicle body of a motor vehicle can have a load-bearing supporting structure in which longitudinal members of solid design and cross members of solid design are connected to one another to form a supporting frame that defines a stable platform to which the remaining components of the motor vehicle can be connected. The supporting structure can support a drive, the individual body parts, functional units of the motor vehicle and a payload and can dissipate the weights thereof onto an underlying surface. A plate-like underbody unit can be connected to the supporting structure to reinforce the supporting structure and the motor vehicle body. The plate-like underbody unit forms the underbody of the motor vehicle, thereby covering and protecting constructional units arranged above the underbody unit from the underlying surface.

US 2014/0246259 connects a battery housing of a traction battery from below to an underbody of a motor vehicle. A lower side of the battery housing faces the underlying surface and is configured as a thin-walled cast aluminum part with outwardly protruding cooling ribs.

There is a need to increase the service life of motor vehicle traction battery.

It is an object of the invention to increase the service life for a motor vehicle traction battery to have a long service life by sufficiently cooling the battery.

SUMMARY OF THE INVENTION

The invention relates to an underbody unit for reinforcing a motor vehicle body of a motor vehicle between a front axle and a rear axle. The underbody unit comprises a floor body that is connectable to the motor vehicle body for dissipating static and/or dynamic loads of the motor vehicle body. The floor body has a substantially upwardly facing upper side for supporting battery cell units of a traction battery for driving the motor vehicle purely electrically, and the floor body has at least one cooling channel for cooling the upper side. A motor vehicle with a traction battery for driving purely electrically may be a hybrid vehicle or an electric vehicle.

The floor body is a component that reinforces the motor vehicle body and therefore has a correspondingly solid design that can dissipate the loads anticipated during operation of the motor vehicle or in the event of a crash. As a result, the floor body is sufficiently stable to support the heavy battery cell units of the traction battery and to define armor plating for the battery cell units. Therefore the battery cell units are protected securely against damage by the underlying surface, for example when the motor vehicle is placed on an obstacle protruding up from the underlying surface, and against penetrating objects that lie on the underlying surface and are hauled upward. At the same time, the floor body of the underbody unit has a comparatively large cross section, as viewed in the horizontal direction, and therefore the at least one cooling channel can be provided in the material of the floor body without significantly weakening the floor body. As a result, the floor body can actively and/or passively cool the battery cell units. Overheating of, and damage to, the battery cell units by heat that is not removed can be avoided. Thus, the floor body can carry out a plurality of functions simultaneously. Use is made of the finding that, in the event of the battery cell units not being arranged below, but rather above the underbody unit in a lower region of the motor vehicle, the underbody unit can be used as part of an armor plated battery housing and, due to the solid configuration, can also be used as a supporting floor and heat exchanger. With the aid of the floor body, which is in any case of solid design, of the underbody unit, the underbody unit, as a supporting plate of a battery housing, can support the battery cells of the traction battery. Armor plating can protect same and as heat exchanger can actively and/or passively cool same with the aid of the cooling channel, and therefore it is possible for a motor vehicle traction battery provided in a lower region of the motor vehicle to have a long service life, and also by can achieve the sufficient cooling of same.

The floor body can extend in the transverse direction of the motor vehicle, in particular between a maximally far right and a maximally far left longitudinal member of a supporting structure of the motor vehicle body. At a distance D of the center lines of the right longitudinal member and of the left longitudinal member, in particular $1.10 \leq d/D \leq 0.80$, preferably $1.00 \leq d/D \leq 0.90$ and particularly preferably $0.98 \leq d/D \leq 0.95$ applies to the extent d of the body floor in the transverse direction. All of the battery cell units of the traction battery are preferably arranged between the left longitudinal member and the right longitudinal member. The left longitudinal member and the right longitudinal member preferably cover at least part of the battery cell units, as viewed in the transverse direction, and therefore the right longitudinal member and the left longitudinal member can serve as armor plating for the battery cell units in the event of a side crash of the motor vehicle. The floor body can extend in the longitudinal direction of the motor vehicle, in particular between the front axle and the rear axle of the motor vehicle. Given a wheel base A between the front axle and the rear axle, in particular $1.10 \leq a/A \leq 0.30$, preferably $1.00 \leq a/A \leq 0.40$, furthermore preferably $0.90 \leq a/A \leq 0.50$ and particularly preferably $0.80 \leq a/A \leq 0.60$ applies for the extent a of the floor body in the longitudinal direction. The floor body is produced in particular from an aluminum material, preferably by aluminum casting.

A first connection for the supply of a cooling medium for cooling the floor body and a second connection for the removal of the cooling medium can be connected to the at least one cooling channel. The first and second connections enable the cooling medium to be conducted from a source outside the underbody unit through the underbody unit to cool or heat the battery cell units for controlling the temperature. The cooling medium can be a liquid, for example cooling water, cooling oil or a cooling agent. The first connection and the second connection can be connected to hose lines of a cooling system. A cooled cooling medium can be introduced into the underfloor unit via the first connection, is heated within the cooling channel and leaves the underbody unit via the second connection in a heated state.

The second connection can be connected outside the underbody unit to the first connection via a cooler and a pump to form a cooling circuit. It is also possible for the second connection to be connected to a heat exchanger of a chiller to withdraw heat from the cooling medium. The cooled cooling medium can be supplied to the underbody unit via a further first connection and can pass via a further second connection to a pump that pumps the cooling medium into the underbody unit via the first connection. In particular, the chiller can cooperate with a condenser and a expansion valve to supply a cooling agent with an appropriately low temperature to the heat exchanger where the cooling agent can be evaporated from the cooling medium coming from the underbody unit to withdraw heat from the cooling medium. The cooling agent can be conveyed in the circuit in particular with the aid of a compressor.

The floor body can be configured as an evaporator for at least partially evaporating the cooling medium. The phase change of the coolant configured as a cooling agent enables a correspondingly high cooling capacity can be achieved within the underbody unit in the cooling channel. Furthermore, the cooling system that is connected via the connections can be simplified. In particular, a common cooling medium can be used for the underbody unit and the cooling system, and therefore heat exchange between the cooling medium used for the underbody unit and a cooling agent used for the cooling system is not required and/or just a single delivery unit, such as compressor or pump, is sufficient for the cyclic process of the cooling system.

The cooling channel may be completely closed upward by a material layer forming the upper side so that the cooling channel is sealed off from the battery cell units by the material layer. Accordingly, cooling medium conducted through the cooling channel will not contact of the battery cell units, and hence an electric short circuit via the cooling medium is prevented. The material layer of the upper side may be integral with the floor body material forming the cooling channel. The upper side can be a flat plane with the upper side defining connecting means for connection to a battery housing. Furthermore, the upper side can be shaped three-dimensionally to specify a defined arrangement and placing of the battery cell units relative to the floor body. For this purpose, the upper side can form positioning marks and/or form-fitting contact surfaces for aligning and positioning the battery cell units.

The cooling channel can be produced by cutting, milling, or extrusion. Machining the floor body enables an individual profile of the cooling channel with plural turns and deflecting regions to be produced easily. Extrusion can easily form plural cooling channels that run substantially parallel to one another and that are connected to one another, for example via bore. These cooling channels can be formed easily and cost-effectively, and unrequired end openings of the cooling channels can be closed.

The floor body may have an upper part forming the cooling channel and the upper side, and a separate lower part of solid design. The upper and lower parts then are connected to each other by welding to limit a flow cross section of the cooling channel. The lower part can be a solid plate that is solid and is substantially unmachined. A machining process, for example, for producing the cooling channel can be provided exclusively in the upper part. In this case, the cooling channel in the upper part can be a groove that is open on one side. The upper part can be placed with the open side of the groove-shaped cooling channel onto the lower part, and therefore a contact surface of the lower part. The contact surface faces the upper part, and forms part of the channel wall of the cooling channel. The cooling channel can be formed by measures that can be easily implemented in terms of construction and production.

In particular, the floor body has a left fastening flange for fastening to a left longitudinal member of a supporting structure of the motor vehicle body and a right fastening flange for fastening to a right longitudinal member of the supporting structure. As a result, the underbody unit can be connected directly to the supporting structure of the motor vehicle body and, via the material of the floor body, can dissipate static and/or dynamic loads which occur. A frame-shaped intermediate housing and/or a housing cover of a battery housing can be connected to the floor body in particular in a vertical extension of outer side walls of the floor body. Additionally or alternatively, parts of the battery housing can likewise be connected to the respective fastening flange, as a result of which fastening means do not need to be provided in the side walls, and therefore, for example, an upper side of the side walls can be used for sealing the battery housing. Furthermore, the fastening flange protruding in particular substantially horizontally can act as a cooling rib in order to remove heat of the battery cell units, which heat is absorbed by the floor body, convectively and/or by heat conduction to the longitudinal members.

Reinforcing ribs may protrude substantially vertically up from the floor body and, together with the floor body, delimit receiving pockets for receiving at least one battery cell unit to form a traction battery for driving the motor vehicle purely electrically. The reinforcing ribs may be integral or unitary with the floor body. The reinforcing ribs enable the underbody unit to be sufficiently stable and rigid so that static and dynamic loads occurring during the operation of the vehicle can be absorbed and dissipated to reinforce the supporting structure of the motor vehicle body with little use of material. The floor body can be configured, for example, in the manner of a trough with reinforcing ribs projecting into the volume of the trough. The reinforcing ribs can run in the longitudinal and transverse directions of the motor vehicle and can intersect one another. As a result, substantially rectangular receiving pockets can be formed. The reinforcing ribs may be connected at least partially to laterally outer side walls of the floor body. The side walls can laterally delimit the volume spanned by the trough. The battery cell units can be inserted at least partially from above into the receiving pockets. The reinforcing ribs of the floor body can function to reinforce the underbody unit and the motor vehicle body but also function to accommodate and cool the battery cell units, thereby performing plural functions at the same time. In addition, the reinforcing ribs can conduct heat produced in the battery cell units onto the floor body, which can be cooled with the aid of the cooling medium conducted through the cooling channel. As a result, the battery cell units are not likely to be overheated or damaged by heat that is not removed. The reinforcing ribs can conduct away heat passively and/or can be cooled actively at the same time.

A downwardly facing lower side of the floor body may armor plated with an impact protection layer. The impact protection layer may be aluminum, steel or a fiber composite material. The impact protection layer can cushion sudden dynamic actions coming from an underlying surface and hence can reduce the risk of damage to and/or deformation of the cooling channel and/or damage to the battery cell units. If the impact protection layer is produced from metal, a comparatively high heat stream can be conducted to the impact protection layer by heat conduction effects and can be removed convectively via a lower side of the impact protection layer. The lower side is exposed to the slipstream.

If the impact protection layer is produced from a fiber composite material, the impact protection layer can be deformed elastically to a greater extent, and therefore plastic deformations of the underbody unit are avoided.

The floor body has a height H in the vertical direction in the region of the cooling channel, and the cooling channel has an extent h in the vertical direction, wherein $0.05 \leq h/H \leq 0.50$, in particular $0.10 \leq h/H \leq 0.40$, preferably $0.20 \leq h/H \leq 0.35$ and particularly preferably $h/H=0.30 \pm 0.03$, wherein in particular H=7 mm±2 mm, preferably H=7 mm±1 mm. As a result, the cooling channel can form a sufficiently large flow cross section to provide a sufficiently high cooling capacity while, at the same time, the floor body is of sufficiently solid configuration to reinforce the motor vehicle body and to act as a supporting floor and armor plating for the battery cell units.

The invention also relates to a traction battery for driving a motor vehicle purely electrically. The traction battery has a plurality of battery cell units inserted in a battery housing. The battery housing has a support plate that supports the battery cell units and is coupled thermally to the battery cell units. The support plate may be the configured, as described above, with an underbody unit for reinforcing a motor vehicle body. The underbody unit may have a supporting plate of a battery housing that can be: a support for the battery cells of the traction battery, armor plating to protect the battery cells and a heat exchanger that can actively and/or passively cool the battery cells with the aid of the cooling channel. Therefore it is possible for a motor vehicle traction battery provided in a lower region of the motor vehicle to have a long service life.

The invention further relates to a motor vehicle comprising a motor vehicle body having a load-bearing supporting structure and a traction battery that is connected to the supporting structure on a lower side of the motor vehicle body for reinforcing the motor vehicle body. The floor body is of solid design and cooperates with the underbody unit of the traction battery to define a supporting plate of a battery housing that can: support the battery cells of the traction battery, define armor plating to protect battery cells, and define a heat exchanger that can actively and/or passively cool the battery cells with the aid of the cooling channel. Therefore, a motor vehicle traction battery can be provided in a lower region of the motor vehicle while having a long service life.

The invention is explained by way of example below using preferred exemplary embodiments with reference to the attached drawings, wherein the features illustrated below, in each case individually and also in combination, can constitute one aspect of the invention.

DETAILED DESCRIPTION

Figure 1:
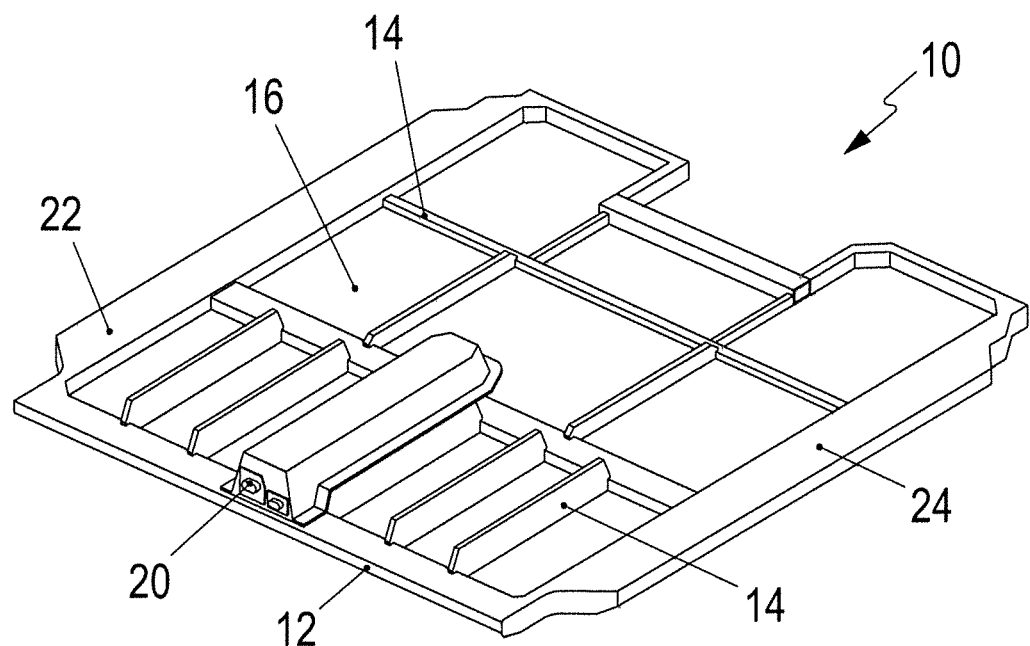
FIG. 1 is a schematic perspective view of an underbody unit in accordance with an embodiment of the invention.
Figure 2:
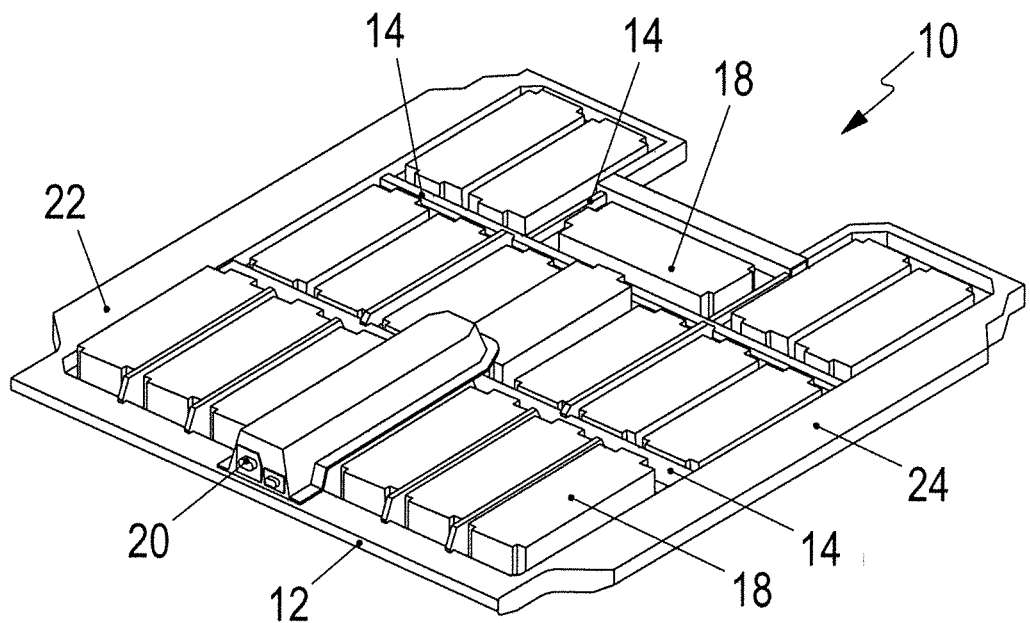
FIG. 2 is a schematic perspective view of the underbody unit from FIG. 1 with battery cell units inserted.

An underbody unit 10 for reinforcing a motor vehicle has a floor body 12, as illustrated in FIG. 1. Reinforcing ribs 14 protrude up from the floor body 12 and run in the longitudinal and transverse directions so that receiving pockets 16 are formed between the intersecting reinforcing ribs 4 and outer side walls of the floor body 12 (FIG. 2), The battery cell units 18 can be inserted into the receiving pockets 16 from above. The battery cell units 18 are connected electrically to one another and can output stored electrical energy via an electric connection 20 and/or can absorb, for storage purposes, electrical energy produced mechanically by a drive train of the motor vehicle. The floor body 12 has laterally protruding left and right fastening flanges 22 and 24, via which the underbody unit 10 can be fastened to a left and right longitudinal member of a supporting structure of a motor vehicle body of the motor vehicle.

Figure 3:
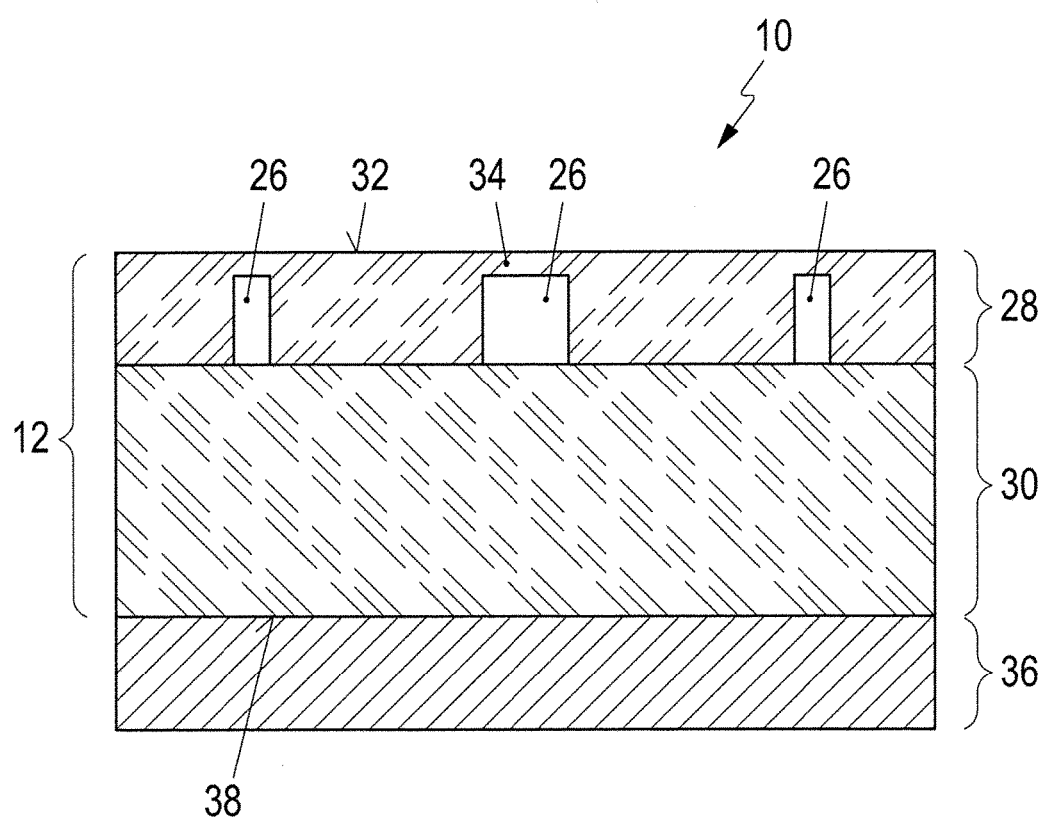
FIG. 3 is a schematic sectional view of the underbody unit from FIG. 1.

As illustrated in FIG. 3, the floor body 12 can have a plurality of substantially horizontally running cooling channels 26 that are connected to a first connection and to a second connection. The floor body 12 can be assembled from an upper part 28 and a separate lower part 30 that is connected to the upper part 28, for example by welding. The cooling channels 26 can be introduced into the lower part 30, for example by milling. The upper part 28 forms an upper side 32 on which the battery cell units 18 can be placed and from which the reinforcing ribs 14 can protrude. A material layer 34 is provided between the upper side 32 and the cooling channels 26 of the floor body 12 to ensure that the cooling channels 26 are spaced from the battery cell units 18 and are sufficiently sealed. Alternatively, the upper part 28 and the lower part 30 can be formed integrally so that the cooling channels 26 are formed by extrusion of the floor body 12.

In the illustrated embodiment, the underbody unit 10 has a separate impact protection layer 36 produced from a material differing from the floor body 12. The floor body 12 can be produced from aluminum while the impact protection layer 36 can be produced from a fiber composite material. The impact protection layer 36 is provided on a lower side 38 of the floor body 12 and can protect the floor body 12 from sudden dynamic actions from an underlying surface.

What is claimed is:

1. An underbody unit for reinforcing a motor vehicle body of a motor vehicle, the underbody unit comprising:
   a floor body connectable to the motor vehicle body for dissipating static and/or dynamic loads of the motor vehicle body, the floor body comprising:
      an upper part having opposite top and bottom surfaces and a plurality of spaced apart downwardly open cooling channels formed in the bottom surface and extending partially towards the top surface, the top surface being free of cooling channels, areas of the bottom surface spaced from the cooling channels being spaced from the top surface by a specified thickness, the top surface being spaced from the channels by a thickness less than the specified thickness, the upper part being solid and unitary between the top and bottom surfaces at locations between the cooling channels; and
      a lower part connected in surface-to-surface contact with the bottom surface of the upper part at positions between the cooling channels, the lower part configured to cover the downwardly-facing openings of the plurality of spaced-apart cooling channels; and
   at least one battery cell unit of a traction battery for driving the motor vehicle purely electrically supported on the top surface of the upper part of the floor body.

2. The underbody unit of claim 1, wherein the plurality of spaced-apart cooling channels are completely closed upward by a material layer forming the top side.

3. The underbody unit of claim 1, wherein the plurality of spaced-apart cooling channels are produced by cutting, milling, or by extrusion.

4. The underbody unit of claim 1, wherein the floor body has a left fastening flange for fastening to a left longitudinal member of a supporting structure of the motor vehicle body and a right fastening flange for fastening to a right longitudinal member of the supporting structure.

5. The underbody unit of claim 1, further comprising reinforcing ribs protruding substantially vertically up from the floor body, the reinforcing ribs together with the floor body delimiting receiving pockets for receiving at least one battery cell unit for the formation of a traction battery for driving the motor vehicle purely electrically, the reinforcing ribs being integral with the floor body.

6. The underbody unit of claim 5, the top surface of the upper part defines a flat plane at locations between the reinforcing ribs.

7. The underbody unit of claim 1, wherein the floor body has a downwardly facing lower side armor plated with an impact protection layer, the impact protection layer being produced from a fiber composite material.

8. The underbody unit of claim 1, wherein the floor body has a height H in the vertical direction in the region of the plurality of spaced-apart cooling channels, and the plurality of spaced-apart cooling channels have an extent h in the vertical direction, wherein $0.05 \leq h/H \leq 0.50$, where $H = 7$ mm $\pm 2$ mm.

9. A traction battery for driving a motor vehicle purely electrically, comprising a plurality of battery cell units inserted in a battery housing, the battery housing having a support plate that supports the battery cell units and is coupled thermally to the battery cell units, and the support plate is configured as the underbody unit of claim 1 for reinforcing a motor vehicle body of a motor vehicle.

10. The underbody unit of claim 1, wherein the upper part is unitary at all locations between the top and bottom surfaces thereof.

11. The underbody unit of claim 1, wherein the floor body has a downwardly facing lower side armor plated with an impact protection layer, the impact protection layer being produced from aluminum.

12. The underbody unit of claim 1, wherein the floor body has a downwardly facing lower side armor plated with an impact protection layer, the impact protection layer being produced from steel.

* * * * *